United States Patent
McCarthy et al.

(10) Patent No.: US 7,906,447 B2
(45) Date of Patent: Mar. 15, 2011

(54) REGENERATION AND REJUVENATION OF SUPPORTED HYDROPROCESSING CATALYSTS

(75) Inventors: Stephen J. McCarthy, Center Valley, PA (US); Chuansheng Bai, Phillipsburg, NJ (US); William G. Borghard, Haddon Heights, NJ (US); William E. Lewis, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 12/384,406

(22) Filed: Apr. 3, 2009

(65) Prior Publication Data

US 2009/0258779 A1    Oct. 15, 2009

Related U.S. Application Data

(60) Provisional application No. 61/123,911, filed on Apr. 11, 2008.

(51) Int. Cl.
*B01J 38/68* (2006.01)
(52) U.S. Cl. ......................................................... 502/24
(58) Field of Classification Search ........................ None
See application file for complete search history.

(56) References Cited

U.S. PATENT DOCUMENTS

| | | | |
|---|---|---|---|
| 4,581,129 A | 4/1986 | Miller et al. | |
| 4,879,265 A * | 11/1989 | Simpson et al. | 502/211 |
| 5,248,412 A | 9/1993 | Fujikawa et al. | |
| 5,254,513 A * | 10/1993 | Sherwood et al. | 502/55 |
| 6,239,054 B1 | 5/2001 | Shukis et al. | |
| 6,566,296 B2 * | 5/2003 | Plantenga et al. | 502/162 |
| 7,087,546 B2 * | 8/2006 | Eijsbouts et al. | 502/33 |

FOREIGN PATENT DOCUMENTS

| | | |
|---|---|---|
| JP | 2009 160498 A | 7/2009 |
| WO | WO 96/41848 | 12/1996 |

OTHER PUBLICATIONS

George, Z.M., et al. "Regeneration of a spent hydroprocessing catalyst" Proceedings International Congress on Catalysis Jul. 1, 1988, pp. 230-237, XP008111700 pp. 231-235.

Arteaga, J.L.G., Fierro, F., Delannay and Delmon, B. "Simulated Deactivation and Regeneration of an Industrial CoMo/y-1203 Hydrodesulphurization Catalyst" Applied Catalysis, vol. 26, 1986, pp. 227-249, XP002545303 pp. 228-230.

Ramaswamy, A.V., et al. "Factors Influencing the Deactivation of Industrial Catalysts. I. Co-Mo-A1203 Hydrodesulfurization Catalysts." Applied Catalysis Jan. 15, 1985, vol. 13, No. 2, pp. 311-319, XP002545304 the whole document.

C'Ecile Glasson, Christophe Geantet, Michel Lacroix, Franck Labruyere and Pierre Dufresne "Beneficial Effect of Carbon on Hydrotreating Catalysts" Journal of Catalysis, vol. 212, 2002, pp. 76-85, XP00254305 pp. 77, 80; table 1.

* cited by examiner

*Primary Examiner* — Melvin C Mayes
*Assistant Examiner* — Stefanie Cohen

(57) ABSTRACT

Methods for rejuvenation of supported metallic catalysts comprised of a Group VIII metal, a Group VIB metal, making use of these metals, an organic complexing agent, and optionally an organic additive, are provided. The rejuvenation includes stripping and regeneration of a spent or partially spent catalyst, followed by impregnation with metals and at least one organic compound. The impregnated, regenerated catalysts are dried, calcined, and sulfided. The catalysts are used for hydroprocessing, particularly hydrodesulfurization and hydrodenitrogenation, of hydrocarbon feedstocks.

23 Claims, No Drawings

REGENERATION AND REJUVENATION OF SUPPORTED HYDROPROCESSING CATALYSTS

This Application claims the benefit of U.S. Provisional Application 61/123,911 filed Apr. 11, 2008.

FIELD OF THE INVENTION

This invention relates to rejuvenation of supported Group VIB plus Group VIII catalyst for use in hydroprocessing, including hydrodesulfurization (HDS) and hydrodenitrogenation (HDN), of hydrocarbon feeds.

BACKGROUND OF THE INVENTION

During hydrotreating of hydrocarbon feedstocks, catalyst activity decreases with time on stream as coke accumulates on the catalyst surface. Eventually, the catalyst must be regenerated by burning off the coke in air to restore activity. Unfortunately, in most cases, the regenerated hydrotreating catalyst has a lower activity than the original fresh catalyst and must subsequently be used in less demanding, lower valued service.

Increasingly stringent environmental regulations will require significant reductions in the sulfur content of transportation fuels. For example, by the end of this decade, maximum sulfur levels for distillate fuel will be limited to 10 wppm in Europe and Japan and 15 wppm in North America. Meeting these ultra-low sulfur requirements, without undercutting distillate endpoint or expensive modifications to existing refineries, may require catalysts with increasingly higher activities. Such higher activity hydrotreating catalysts are typically higher cost due to higher metal loadings. Due to these higher costs, it would be desirable to regenerate and reuse these spent catalysts. However, as noted above, regeneration procedures often result in catalysts with reduced activities.

What is needed is a method for rejuvenating high activity hydroprocessing catalysts that allows reuse of the rejuvenated catalyst without having to settle for use in a lower value, less demanding service.

SUMMARY OF THE INVENTION

In an embodiment, a process for rejuvenating a supported hydroprocessing catalyst is provided. The process includes preparing a solution, slurry, or other mixture containing at least one Group VIB metal, at least one Group VIII metal, and an organic complexing agent. This solution will be used as an impregnation solution. The process also includes stripping a supported hydrotreating catalyst, the supported hydrotreating catalyst including a support, at least one Group VIB metal, and at least one Group VIII metal. Preferably, the supported hydrotreating catalyst is a spent or partially spent catalyst. Preferably, the supported hydrotreating catalyst is stripped with a flowing gas stream at a temperature of about 350° C. or less. The stripped catalyst is then regenerated in the presence of an oxygen containing gas at a temperature of about 500° C. or less. The regenerated catalyst is then impregnated with the solution, slurry, or mixture. After impregnation, the impregnated regenerated catalyst is dried at a temperature of from 200 to 450° C. to produce a partially calcined, impregnated, regenerated catalyst having a carbon content of at least 5 wt % based on the weight of the partially calcined, impregnated, regenerated catalyst, the organic solvent not being present on the partially calcined, impregnated support. The partially calcined, impregnated regenerated catalyst is then sulfided.

In another embodiment, a process for making a supported hydroprocessing catalyst from a regenerated catalyst is provided. The process includes preparing a solution, slurry, or other mixture containing at least one Group VIB metal, at least one Group VIII metal, and an organic complexing agent. A regenerated catalyst is impregnated with the solution, slurry, or mixture, the regenerated catalyst including a support, at least one Group VIB metal, and at least one Group VIII metal. The impregnated, regenerated catalyst is dried at a temperature of from 200 to 450° C. to produce a partially calcined, impregnated, regenerated catalyst having a carbon content of at least 5 wt % based on the weight of the partially calcined, impregnated, regenerated catalyst, the organic solvent not being present on the partially calcined, impregnated support. The partially calcined, impregnated, regenerated catalyst is then sulfided.

Preferably, the supported catalyst rejuvenated by the above methods corresponds to a supported fresh catalyst made according to the following process. A solution, slurry, or other mixture is prepared containing at least one Group VIB metal, at least one Group VIII metal, and an organic complexing agent. A support is impregnated with the solution, slurry, or mixture. The impregnated support is dried at a temperature of from 200 to 450° C. to produce a partially calcined, impregnated support having a carbon content of at least 5 wt % based on the weight of the partially calcined, impregnated support, the organic solvent not being present on the partially calcined, impregnated support. The partially calcined, impregnated support that includes at least a portion of the carbon content is then sulfided.

DETAILED DESCRIPTION OF THE INVENTION

In various embodiments, the catalysts are rejuvenated supported catalysts. The rejuvenated supported catalysts are based on a supported catalyst that is used initially for hydrotreatment of a hydrocarbon feedstock. The initial hydrotreatment causes the supported catalyst to become a spent or partially spent catalyst, due at least in part to the presence of coke on the spent or partially spent catalyst.

In an embodiment, the rejuvenation process begins by removing feed and/or product hydrocarbon accumulated in the spent or partially spent supported catalyst. The feed and/or product hydrocarbon is removed by stripping with a flowing gas stream at temperatures below about 350° C. The stripped catalyst is then regenerated by contacting the stripped catalyst with an oxygen containing gas at temperatures of less than about 500° C. The regenerated hydrotreating catalyst is then impregnated with a solution containing one or more organic compounds. Preferably, the solution also contains additional Group VIB and/or Group VIII metals. After drying, the catalyst is calcined in nitrogen, air, or a mixture of nitrogen and air at temperatures of up to 450° C. to substantially decompose the organic compounds but yet retain some residual carbon on the catalyst surface. Residual carbon content is preferable between 5 and 10 wt %.

The rejuvenated hydrotreating catalyst prepared by this invention can have significantly higher desulfurization activity than the original fresh hydrotreating catalyst. Also, catalyst prepared by this invention will be significantly lower cost than similar catalysts prepared using fresh carrier versus a used hydrotreating catalysts. Further, a viable method for regenerating and rejuvenating spent hydrotreating catalyst will significantly improve the economics for using high activity catalyst for producing ultra-low sulfur transportation fuels.

The spent or partially spent supported catalyst can be either a conventional or additive based catalyst comprised of a Group VIB and Group VII metal supported on a carrier that has been used in any hydrotreating process. The support portion of the supported catalyst can be comprised of any of the conventional metal oxides, such as alumina, silica, silica-alumina, magnesia, titania, zirconia, or mixtures thereof. The support portion of the catalyst can have any convenient shape, such as spheres, pellets, or extrudate shapes.

Preferably, spent or partially spent catalysts prior to rejuvenation have only a moderate level of coke, such as less than about 15 wt %, or less than about 20 wt %. After rejuvenation according to the invention, the supported catalyst can preferably have at least about 70% of the surface area and crush strength of the corresponding fresh catalyst. After rejuvenation according to the invention, the supported catalyst can preferably have at least about 100% by weight of the Group VIB and Group VIII metal content of the corresponding fresh catalyst, or at least about 105%, or at least about 110%, or at least about 115%. Although the supported catalyst can have a metals content after regeneration of only 90% by weight of the Group VIB and Group VIII metals of the corresponding fresh catalyst, preferably the impregnation step will add sufficient metals to increase the metals content to at least about 100%. Note that the above weights for metals content refer to the metals in their oxide form. Additionally, after rejuvenation according to the invention, the rejuvenated catalyst preferably has reduced levels of trace contaminants according to the following table. Note that some catalyst supports contain silicon oxide. Thus, the preferable amount of silicon oxide in the rejuvenated catalyst is a relative value, based on the amount of silicon oxide present in the corresponding fresh catalyst.

TABLE 1

| Contaminant | Amount (wt %) |
|---|---|
| $SiO_2$ | <Fresh amount + 2.0 |
| $Na_2O$ | <0.3 |
| Fe | <0.3 |
| CaO | <0.3 |
| As | <0.1 |
| C | <1.5 |
| S | <1.0 |

In an embodiment, the rejuvenated catalyst particles are comprised of Group VIB metals, preferably Mo or W, most preferably Mo, plus Group VIII metals, preferably Group VIII non-noble metals, more preferably Co or Ni, most preferably Co, and a residual organic carbon content of at least about 5 wt. %, based on supported catalyst; with the balance being a carrier or support, wherein the carrier preferably has a minimum pore volume of 0.35 per volume of carrier, more preferably a minimum pore volume of 0.40. Preferably, the rejuvenated catalyst includes a total metals content of at least about 35 wt %, calculated as metal oxides. The Group designations are based on the Sargent-Welch Periodic Table, copyright 1968. As noted above, the catalyst contains an organic residue, preferably a carbon residue. The organic residue is a factor leading to increased activity of the catalyst for hydrotreating.

In another embodiment, the rejuvenated catalysts are supported catalysts wherein the supported catalyst particles are comprised of Group VIB metals, preferably Mo or W, most preferably Mo, plus Group VIII metals, preferably Group VIII non-noble metals, more preferably Co or Ni, most preferably Co, provided that the catalysts have a total metals content of between about 20-60 wt. %, preferably at least about 20 wt. %, more preferably at least about 30 wt. %, and even more preferably at least about 35 wt. %, calculated as metal oxides, and a residual organic carbon content of between about 1-50 wt. %, preferably between about 5-20 wt. %, based on supported catalyst; with the balance being a carrier or support. The molar ratio of Group VIII non-noble metal to Group VIB metal in the supported catalysts ranges generally from about 10 to 1 to about 1 to 10. Preferably, the ratio of Group VIII non-noble metal to Group VIB metal is less than about 3 to 1, and more preferably less than about 2 to 1. Preferably, the ratio of Group VIII non-noble metal to Group VIB metal is greater than about 1 to 3, and more preferably greater than about 1 to 2. The metals are preferably present as organic complexes (or complexes of organic residues thereof) and/or oxides of the corresponding metals, or if the supported catalyst precursor has been sulfided to form the catalyst composition, sulfidic compounds of the corresponding metals. In an embodiment, the organic complex or organic residue complex can be based on an organic acid, such as a carboxylic acid.

In still another embodiment, one or more of the metals added during the rejuvenation can be different from the metals present on the spent or partially spent supported catalyst.

In a preferred embodiment, the spent or partially spent supported catalyst is a supported catalyst that was initially formed using the impregnation procedures described for the rejuvenation.

Suitable carriers (supports) can include catalyst supports, such as refractories, such as silicon carbide, and metal oxides such as alumina, silica, silica-alumina, magnesia, zirconia, boria, yttria, titania and the like. Especially preferred are alumina and silica. Preferred aluminas are porous aluminas such as gamma, theta, delta, kappa, eta or mixtures of crystalline phases such as alpha and theta. The acidity and/or other properties of metal oxide supports can be controlled by adding promoters and/or dopants, or by controlling the nature of the metal oxide support, e.g., by controlling the amount of silica incorporated into a silica-alumina support. Examples of promoters and/or dopants include halogens, especially fluorine, phosphorus, boron, yttria, rare-earth oxides and magnesia. Promoters such as halogens generally increase the acidity of metal oxide supports while mildly basic dopants such as yttria or magnesia tend to decrease the acidity of such supports.

In an embodiment, the support or carrier can preferably possess large pore volume per volume of support. By large pore volume is meant that the support should have a pore volume of at least 0.35 cc/cc of support, preferably a pore volume of at least 0.40 cc/cc. The selection of supports having large pore volumes relates to maximizing the loading of impregnation solution per individual impregnation step.

It is within the scope of this invention that the catalyst compositions also contain any additional component that is conventionally present in hydroprocessing catalysts such as an acidic component, e.g. phosphorus or boron compounds, additional transition metals, rare earth metals, main group metals such as Si or Al, or mixtures thereof. Examples of suitable additional transition metals include rhenium, ruthenium, rhodium, iridium, chromium, vanadium, iron, platinum, palladium, cobalt, nickel, molybdenum, zinc, niobium, or tungsten. All these metal compounds are generally present in the sulfided form if the catalyst composition has been sulfided. Prior to sulfidation, at least a portion of one or more of these metals can be complexed by the organic compound-based material in the catalyst precursor. After sulfidation, it is believed that at least a portion of the sulfided metals are still somehow directly or indirectly bound to an organic compound-based material or organic residue in the catalyst.

Feedstocks suitable for processing by the catalysts of this invention include feedstocks for the production of distillate fuels having low sulfur contents. Suitable feedstocks include distillates with boiling points ranging from naphtha to vacuum gas oil, preferably boiling in the range 25 to 475° C., measured by ASTM D 86 or ASTM 2887, derived from mineral or synthetic sources. Preferred feedstocks are those having boiling points from 170 to 350° C. and suitable for producing distillate fuels, especially diesel fuels. Feedstocks may have high contents of nitrogen- and sulfur-contaminants. Feeds containing up to 0.2 wt. % of nitrogen, based on feed and up to 3.0 wt. % of sulfur can be processed in the present process. Sulfur and nitrogen contents may be measured by standard ASTM methods D5453 and D4629, respectively.

Rejuvenation Conditions

In various embodiments, the rejuvenated catalysts according to the invention are prepared by providing a spent or partially spent supported catalyst, stripping and regenerating the catalyst, and then impregnating the catalyst with an impregnation solution.

Stripping of the spent or partially spent supported catalyst can be performed in any convenient manner. One example of a stripping method is solvent stripping, where the spent or partially spent catalyst is exposed to a solvent in order to remove at least some of the hydrocarbons and/or coke present on the catalyst prior to regeneration. Examples of suitable solvents include aromatic solvents, polar organic solvents, and non-polar organic solvents. Solvent stripping can also involve a sequence of solvents to more effectively remove various types of hydrocarbons. For example, a solvent stripping sequence could include exposing the spent or partially spent catalyst first to an aromatic solvent, such as xylene, then to a non-polar solvent, such as cyclohexane, and then finally to a polar solvent, such as acetone. Any other convenient solvent stripping sequence may also be used.

Preferably, stripping of the spent or partially spent supported catalyst is performed by exposing the supported catalyst to a flowing gas stream. The stripping temperature can be any convenient temperature less than about 350° C. Preferably, the stripping temperature is at least 50° C., or at least 100° C. In an embodiment, the flowing gas stream includes gases that art inert relative to the materials present on the spent or partially spent catalyst, such as nitrogen, water, carbon dioxide, or noble gases. Alternatively, an oxygen containing gas (such as air) may be used. However, the presence of an oxygen containing gas is likely to permit some removal of coke from the catalyst, so the stripping conditions must be appropriately selected to avoid excessive heating during the stripping step.

Regeneration of the stripped catalyst can be performed in any convenient manner. During regeneration, the stripped catalyst is contacted with an oxygen containing gas at an elevated temperature. In various embodiments, the temperature during regeneration is at least about 300° C., or at least about 350° C., and less than about 500° C., or less than about 450° C.

The impregnation solution for impregnating the regenerated catalyst includes Group VIB/Group VIII compounds, preferably Group VIB/non-noble metal Group VIII compounds, more preferably cobalt compounds, molybdenum compounds, an organic complexing agent, and optionally other organic additives such as alcohols or polyols, (e.g., ethylene glycol), aldehydes (e.g., glyoxal), ketones, or amines or diamines. The metal compounds include soluble salts and insoluble compounds that become soluble under certain conditions. Non-limiting examples of suitable Co precursor compounds include carbonates, nitrates, sulfates, acetates, chlorides, hydroxides, hydroxycarbonates, acetyl acetates, acetyl acetonates, metallic Co(0), Co oxides, Co carboxylates (in particular Co glyoxylate), Co citrate, Co gluconate, Co tartrate, Co glycine, Co lactate, Co naphthenate, Co oxalate, Co formate, Co malate, Co pyruvate, Co glycolate, and mixtures thereof. Preferred molybdenum and tungsten precursor compounds include alkali metal or ammonium molybdate (also peroxo-, di-, tri-, tetra-, hepta-, octa-, or tetradecamolybdate), molybdic acid, phosphomolybdic acid, phosphotungstic acid, Mo—P heteropolyanion compounds, W—Si heteropolyanion compounds, Co—Mo—W heteropolyanion compounds, alkali metal or ammonium tungstates (also meta-, para-, hexa-, or polytungstate), acetyl acetonates, Mo(0) metal, Mo oxides, Mo peroxo complexes, and mixtures thereof.

In still other embodiments, any suitable Group VIII or Group VIB metal reagent can be used to prepare Group VIII or Group VIB metal solutions. Additionally, the solution can further include other transition metals. Examples of suitable additional transition metals include rhenium, ruthenium, rhodium, iridium, chromium, vanadium, iron, platinum, palladium, cobalt, nickel, molybdenum, zinc, niobium, or tungsten. Preferably, the additional transition metal is one or more of Co, Mo, Ni, W, Zn, Fe, Cu, or Mn.

Organic acids are a preferred class of organic complexing agent. Non-limiting examples of organic complexing agents suitable for use herein include pyruvic acid, levulinic acid, 2-ketogulonic acid, keto-gluconic acid, thioglycolic acid, 4-acetylbutyric acid, 1,3-acetonedicarboxylic acid, 3-oxo propanoic acid, 4-oxo butanoic acid, 2,3-diformyl succinic acid, 5-oxo pentanoic acid, 4-oxo pentanoic acid, ethyl glyoxylate, glycolic acid, glucose, glycine, oxamic acid, glyoxylic acid 2-oxime, ethylenediaminetetraacetic acid, nitrilotriacetic acid, N-methylaminodiacetic acid, iminodiacetic acid, diglycolic acid, malic acid, gluconic acid, acetylacetone, citric acid, tartaric acid, aconitic acid, suberic acid, tricarballylic acid, malonic acid, succinic acid, glutaric acid, mucic acid, and glycolic acid. Note that the ammonium salts of acids are also suitable. Preferred organic acids are glyoxylic acid, oxalacetic acid, 2-ketogulonic acid, alpha-ketoglutaric acid, 2-ketobutyric acid, pyruvic acid, keto-gluconic acid, thioglycolic acid, and glycolic acid. Most preferred are citric acid, glyoxylic acid, pyruvic acid, and oxalacetic acid.

Organic acids suitable for use in the practice of the present invention include those containing a functional group selected from the group consisting of carboxylic acid —COOH, hydroxmate acid —NOH—C=O, hydroxo —OH, keto —C=O, amine: —NH2, amide: —CO—NH2, imine: CNOH, thiol: SH, epoxy: =COC=, and combinations thereof. These groups are traditionally categorized as metal binding groups or chelating agents, which form metal ligand complexes in aqueous solution. Without being bound by any particular theory, it is believed that complexation of the organic group during catalyst formation steps plays an important role.

In another embodiment, a regenerated catalyst can be impregnated with a solution, slurry, or mixture composed of a Group VIB metal, a Group VIII metal, and an organic complexing agent or additive, where the organic additive serves as a solvent. In such an embodiment, water is not used as a solvent. Instead, the organic complexing agent is used as the organic solvent. The Group VIB metal and Group VIII metal can be provided as salts. In a preferred embodiment, at least one of the Group VIB metal salt and the Group VIII metal salt are formed using an anion that is the conjugate base of the solvent. For example, when 2,4-pentanedione (acetylacetone) is used as a solvent, either the acetyl acetonate salt of a Group VIB metal, such as molybdenum, or the acetyl acetonate salt of a Group VIII metal, such as cobalt, or both could be used to form the solution, slurry, or mixture. In a preferred embodiment, impregnation of a catalyst with this type of solution is performed by using an amount of solution that is similar to the pore volume of the catalyst. For example, per volume of catalyst, the volume of solution used can be from about 0.9 times to 1.05 times the pore volume of the catalyst. Preferably, a sufficient level of metal can be impregnated in the support with a single impregnation using this type of solution.

In various other embodiments, the impregnation solution may be an aqueous solution and includes a soluble Group VIII metal component, a soluble Group VIB metal component, at least one organic complexing agent and optionally, an organic additive. In embodiments where a solvent different from the organic complexing agent is used, the molar ratio of the organic complexing agent (such as carboxylic acid) to Group VIII metal component plus Group VIB metal component is from about 1 to 10, preferably at least about 2, and preferably less than about 6. In an alternative embodiment where the organic acid includes multiple acid functional groups (such as multiple —COOH groups), the ratio of organic acid functional groups to the group VIII metal component plus Group VIB metal component can be from about 1 to 10, preferably at least 2, and preferably less than 6. The Group VB/Group VIII metal component may be added as a metal compound of limited solubility, e.g., $CoCO_3$, provided that the metal compound of limited solubility reacts with the organic acid component to form a soluble metal component. The order of mixing of metal components is not critical and the process conditions for mixing process conditions during the mixing step are generally not critical. In an embodiment, it is preferred to solubilize metal components of limited solubility prior to adding the other metal components. It is, e.g., possible to add all components at ambient temperature at their natural pH (if a suspension or solution is applied), again provided that it is preferred to solubilize metal components of limited solubility prior to adding the other metal components.

An organic additive (other than the organic complexing agent) may also be added to the impregnation solution. If an organic additive is desired as part of the catalyst precursor, it may be added to the solution used to impregnate the carrier. The organic additive may be added together with Group VIB or Group VIII metals, may be added together with the third metal salt, or may be added separately to the impregnating solution. The amount of organic additive may range from a molar ratio of 0.01 to 5 moles additive per mole of Group VIB metal plus Group VIII metal.

In an embodiment, an organic additive can be a compound having 2 to 10 carbon atoms and containing at least 2 oxygen atoms, and includes polyols, glycols and ethers thereof and aldehydes or ketones. Examples of such additives include glyoxal, glycerol, ethylene glycol, propylene glycol, dipropylene glycol, trimethylol propane, diethylene glycol, triethylene glycol, tetraethylene glycol, ethylene glycol monoethyl ether, ethylene glycol monobutyl ether. Organic additives having at least 2 oxygen atoms include polyethylene glycols having a molecular weight less than 600.

Still other additives are compounds having at least 2 nitrogen atoms and having 2-10 carbon atoms. Examples include ethylenediamine, propylene diamine, 1,3-diaminobutane, and 1,3-pentanediamine. Other additives include compounds having at least one oxygen atom and one nitrogen atom, such as ethanol amine, diethanol amine and triethanol amine. In yet another embodiment, the organic additive can be composed of two or more suitable organic additive compounds.

During preparation and mixing of the impregnation solution, it is generally preferred to keep the temperature below the boiling point of the solvent, such as water, to facilitate easy handling of the components. However, if desired, temperatures above the solvent boiling point or different pH values can be used. If the reaction during the mixing step is carried out at increased temperatures, the suspensions and solutions that are added during the mixing step are preferably preheated to an increased temperature which can be substantially equal to the reaction temperature.

The impregnation solution is then added to the stripped and regenerated catalyst (the catalyst preferably having the pore volume range noted above), preferably at temperatures from 20 to 80° C., using the incipient wetness technique. The volume of the impregnation solution may be more than the water pore volume of the regenerated catalyst, for example, 1.2 times the water pore volume, in order to increase the amount of metal oxides on the support. Preferably, the regenerated catalyst should be mixed, such as gently stirred, as impregnation solution is added to ensure even distribution of the metal compounds over the regenerated catalyst. In incipient wetness impregnation or variations thereof, the water pore volume of the support is determined first. The same volume of the impregnation solution is added to the support so that all solution would go into the support. In a variation, a slightly larger volume may be used to get more metals onto the support. For example, if the water pore volume of the support is 1.22 cc/g of support, 1.5 cc (23% more) of impregnation solution can be used for every gram of support. This is illustrated infra in Example 1.

The impregnated support is then dried. In embodiments involving forming a catalyst precursor on a support, an optional first drying step may be used, where drying temperatures are those sufficient to remove water from the impregnated support and may range from about 60 to 120° C., in air or an inert atmosphere such as nitrogen. After the optional drying step, the impregnated support is further exposed to drying temperatures of from about 100 to 450° C., preferably 200 to 450° C., more preferably at least 300° C., and more preferably less than 400° C., to produce a partially calcined catalyst precursor. Note that the desired drying step may vary depending on the nature of the organic components. This further heating is continued for a time effective to partially decompose organic components including organic acids and any organic additives to organic residues, which can be characterized in terms of residual organic carbon. In an embodiment, at least a portion of the organic residue remains on the catalyst precursor, so that residual organic carbon constitutes about 5 to 20 wt. %, preferably at least 10 wt. %, and preferably 15 wt. % or less, of the weight of the catalyst precursor (includes support, metal complexes, and organic residual carbon). Note that the organic residues remaining in the catalyst precursor after drying are no longer in the form of the original organic additive(s) or organic complexing agent(s) that were impregnated on the support. While an organic residue is maintained on the partially calcined support, the original organic additive has been chemically decomposed or reacted into a different form.

Optionally, the impregnated regenerated catalyst may be subjected to at least one additional impregnation cycle. The impregnation and mixing conditions may be the same as noted above for subsequent impregnation cycles following the first impregnation cycle.

While not wishing to be bound to any theory, the organic residue may influence metal dispersion and may help avoid unwanted crystalline phases. The residual organic carbon content of a catalyst precursor or catalyst may be analyzed by any conventional carbon analysis instrument, such as LECO carbon analyzer manufactured by the LECO Corporation. The effective amount of time for decomposition will be that needed to reach the desired residual organic carbon content and will generally range from about 1 second to about 24 hours. In another preferred embodiment, the furnace is ramped from room temperature to about 325° C. in one hour. The drying/partial calcination/decomposition can be carried out in the presence of: flowing oxygen-containing gas (air), flowing nitrogen, or static air or inert gas (no gaseous supply). It is preferred to carry out the calcination in the presence of an inert gas such as nitrogen.

The drying/partial calcination/decomposition step can be combined with the preceding optional drying step as a single continuous step. It will be understood that the preparation conditions are controlled and designed so that the mixed solution does not go through violent evaporation, spill or interruption during the entire drying/partial calcination sequence.

Finally, it is preferred to sulfide the at least partially calcined catalyst precursor prior to or during the hydroprocessing process. Sulfiding the catalyst precursor produces the catalyst composition. The sulfiding process may take place ex situ or in situ and in the gas phase or liquid phase. In the ex situ process the catalyst precursor is contacted with a sulfiding agent such as hydrogen sulfide and hydrogen, e.g., 10% $H_2S/H_2$, at elevated temperatures for a period of time sufficient to sulfide the catalyst precursor. In the in situ process, the catalyst precursor is loaded into the hydrotreating reactor and contacted with hydrogen containing a sulfiding agent such as hydrogen sulfide in the presence or absence of a hydrocarbon feed. The hydrogen sulfide may also be provided directly by decomposition of an additive (spiking agent) added either directly to the hydrogen treat gas or to the feedstock. Spiking agents which may serve as a hydrogen sulfide precursor include at least one of carbon disulfide, thiophene, mercaptan, organic sulfide, dialkyl disulfide, diaryl disulfide and organic polysulfide, preferably dimethyl sulfide or dimethyl disulfide. Alternatively, the catalyst precursor could be loaded with sulfur compounds that decompose to $H_2S$ when treated under hydrogen at elevated temperature for a period of time sufficient to sulfide the catalyst precursor.

Hydroprocessing Process

The term "hydroprocessing" encompasses all processes in which a hydrocarbon feed is reacted with hydrogen at effective temperatures and pressures, and include hydrogenation, hydrotreating, hydrodesulfurization, hydrodenitrogenation, hydrodemetallation, hydrodearomatization, hydroisomerization, hydrodewaxing, and hydrocracking including selective hydrocracking. Preferred hydroprocessing processes include hydrotreating. Preferred hydrotreating include hydrodesulfurization and hydrodenitrogenation.

Hydrotreating conditions involve temperatures in the range 150° C. to 400° C., preferably 200° C. to 400° C. at pressures in the range of 740 to 20786 kPa (100 to 3000 psig), preferably 1480 to 13891 kPa (200 to 2000 psig), a space velocity of from 0.1 to 10 LHSV, preferably 0.5 to 5 LHSV, and a hydrogen treat gas rate of from 89 to 1780 $m^3/m^3$ (500 to 10000 scf/B), preferably 178 to 890 $m^3/m^3$ (1000 to 5000 scf/B).

Hydrotreating typically reduces nitrogen and sulfur contaminants in the feedstock by converting these contaminants to ammonia and hydrogen sulfide, respectively. These gaseous contaminants may be separated from the hydrotreated feedstock using conventional techniques such as strippers, knock-out drums and the like.

The hydrotreating reaction stage can be comprised of one or more fixed bed reactors or reaction zones each of which can comprise one or more catalyst beds of the hydroprocessing catalyst. Although other types of catalyst beds can be used, fixed beds are preferred. Such other types of catalyst beds include fluidized beds, ebullating beds, slurry beds, and moving beds. Interstage cooling or heating between reactors or reaction zones, or between catalyst beds in the same reactor or reaction zone, can be employed since the desulfurization reaction is generally exothermic. A portion of the heat generated during hydrotreating can be recovered. Where this heat recovery option is not available, conventional cooling may be performed through cooling utilities such as cooling water or air, or through use of a hydrogen quench stream. In this manner, optimum reaction temperatures can be more easily maintained. It is also within the scope of this invention to use other catalysts in the case of multiple catalyst beds. Such other catalysts may comprise conventional hydroprocessing catalysts.

The following examples will serve to illustrate, but not limit this invention.

EXAMPLE 1

This example is directed to catalyst preparation. A supported hydrotreating catalyst is first used in a hydrotreatment process. After a sufficient length of time, the supported hydrotreating catalyst can become at least partially spent. This at least partially spent catalyst can be stripped to remove any feedstock and/or product present on the catalyst. The stripped catalyst can then be regenerated.

The following procedure can be used for impregnating a regenerated catalyst as described above with a solution. Cobalt carbonate can be mixed with citric acid in a citric acid to Co molar ratio of 1.2 and the aqueous mixture can be heated at 50° C. until the cobalt carbonate is dissolved. Ammonium heptamolybdate can then be added in an Mo/Co ratio of 2:1 to the resulting solution and stirred without further heating until the ammonium heptamolybdate is dissolved. Additional citric acid can be added to the resulting solution to adjust the citric acid:cobalt molar ratio to 1.8. Note that citric acid includes 3 —COOH functional groups. Thus, the molar ratio of —COOH functional groups to cobalt is 5.4, and the molar ratio —COOH functional groups to (Mo+Co) is 1.8. Ethylenediamine can then be slowly added to the solution with stirring until the ethylenediamine:Co ratio is 1.8 to form the impregnation solution.

The regenerated catalyst described can be impregnated with the impregnation solution at a ratio of 1.5 ml per gram of support. The impregnated support can be heated under nitrogen flow at 110° C. for 4 hr and at 375° C. for 4 hr. Optionally, the cooled support can be further impregnated in a second cycle with the same impregnation solution at a ratio of 1.34 ml per gram of support. If the optional further impregnation is used, the support can again be heated under nitrogen flow at 110° C. for 4 hr and at 375° C. for 4 hr.

EXAMPLE 2

This example is directed to preparation of a fresh catalyst using an impregnation method similar to the method used for rejuvenation. Fresh catalysts were prepared using commercially available alumina supports having the following properties:

(A) Large pore alumina beads with particle diameters in the range of 1.2-2.4 mm, BET SA: 150 m$^2$/g, Hg pore volume: 1.16 cc/g, median pore diameter by Hg: 299 Å, density: 0.45 g/cc, water pore volume: 1.14 cc/g, water pore volume per cc of support: 0.51 cc/cc.

(B) Large pore alumina beads with particle diameters in the range of 2.4-4.8 mm, BET SA: 244 m$^2$/g, Hg pore volume: 1.23 cc/g, median pore diameter by Hg: 162 Å, density: 0.43 g/cc, water pore volume: 1.22 cc/g, water pore volume per cc of support: 0.52 cc/cc.

The following procedure was used for impregnating the above alumina supports with a solution. Cobalt carbonate was mixed with citric acid in a citric acid to Co molar ratio of 1.2 and the aqueous mixture heated at 50° C. until the cobalt carbonate dissolved. Ammonium heptamolybdate was added in an Mo/Co ratio of 2:1 to the resulting solution and stirred without further heating until the ammonium heptamolybdate dissolved. Additional citric acid was added to the resulting solution to adjust the citric acid:cobalt molar ratio to 1.8. Note that citric acid includes 3 —COOH functional groups. Thus, the molar ratio of —COOH functional groups to cobalt was 5.4, and the molar ratio —COOH functional groups to (Mo+Co) was 1.8. Ethylenediamine was slowly added to the solution with stirring until the ethylenediamine:Co ratio was 1.8 to form the impregnation solution.

Alumina support (B) was impregnated with the impregnation solution at a ratio of 1.5 ml per gram of support. The impregnated support was heated under nitrogen flow at 110° C. for 4 hr and at 375° C. for 4 hr. The cooled support was impregnated in a second cycle with the same impregnation solution at a ratio of 1.34 ml per gram of support. The support was then heated under nitrogen flow at 110° C. for 4 hr and at 375° C. for 4 hr.

The above fresh catalysts would be suitable for use in hydrotreating, and then subsequent rejuvenation according to the method of Example 1. In such a rejuvenation process, the spent or partially spent catalyst would be stripped and regenerated. The regenerated catalyst would then be impregnated according to above method. Note that due to the presence of metals on the regenerated catalyst, preferably only one impregnation step would be used.

EXAMPLE 3

This example is directed to the catalyst testing protocol. A fresh catalyst was prepared by a double impregnation of support (A) from Example 2 with a solution containing Co, Mo, citric acid (citric acid:Co molar ratio of 1.8) and ethylene glycol (ethylene glycol:citric acid molar ratio of 1.8). The impregnated support contained 442 mg MoO$_3$ and 115.1 mg CoO per 1 ml of support after calcining at 375° C. under nitrogen. The calcined support was sulfided in situ at 500 psi (3448 kPa) and a treat gas rate of 700 Scf/B (125 m$^3$/m$^3$), and tested for HDS activity in a reactor with a catalyst loading of 1.0 cc. In comparison, the commercially available Ketjenfine® 757 (KF-757) was evaluated in a parallel reactor under the same condition. After an in-situ sulfiding step, the catalysts were subjected to a virgin distillate feed (Feed #1 in Table 2) at a temperature of 625° F., a total of 500 psig pressure, and a hydrogen gas treat rate of 700 SCF/B. After 144 hr of running on feed, the catalyst HDS activity (volumetric) was 225% of the commercially available catalyst (KF-757) run under the same conditions on the basis of 1.5 order kinetics.

The test feed was then changed to another distillate feed (Feed #2 in Table 1), and the test condition was changed to these lower pressure conditions: a total pressure of 220 psig, 625° F., and a hydrogen gas treat rate of 700 SCF/B. Catalyst activity was 135% when compared to KF-757 under the same conditions.

TABLE 2

Hydrocarbon feedstock used to compare catalyst hydrodesulfurization and hydrodenitrogenation.

| | Sulfur, wt % | Nitrogen, ppm | API | Aromatics, wt % | T95, ° F. |
|---|---|---|---|---|---|
| Feed #1 | 1.86 | 167 | 32.2 | 32.8 | 773 |
| Feed #2 | 0.45 | 39 | 37.9 | 25.7 | 670 |

EXAMPLE 4

A fresh catalyst was prepared by a double impregnation of support (B) from Example 2 with a solution containing Co, Mo, citric acid (citric acid:Co molar ratio of 1.8) and ethylenediamine (ethylenediamine:Co molar ratio of 1.8). The impregnated support contained 475 mg MoO$_3$ and 123.6 mg CoO per 1 ml of support after calcining at 375° C. under nitrogen. The calcined support was sulfided in situ at 500 psi (3448 kPa) and a treat gas rate of 700 Scf/B (125 m$^3$/m$^3$) and tested for HDS activity in a reactor with a catalyst loading of 1.0 cc. In comparison, commercially available KF-757 was evaluated in a parallel reactor under the same condition. After an in-situ sulfiding step, the catalysts were subjected to a virgin distillate feed (Feed #1 in Table 1) at a temperature of 625° F., a total of 500 psig pressure, and a hydrogen gas treat rate of 700 SCF/B. After 144 hr of running on feed, the catalyst HDS activity was 300% of the KF-757 run under the same conditions.

The above impregnation, calcination, and sulfidation steps can also be used to form a rejuvenated catalyst. In such a rejuvenation process, a spent or partially spent catalyst can be stripped and regenerated. The regenerated catalyst can then be impregnated according to above method. Note that due to the presence of metals on the regenerated catalyst, preferably only one impregnation step can be used.

EXAMPLE 5

A fresh catalyst was prepared using the procedure of Example 2, where an alumina support (SA6578, BET surface area=150 m$^2$/g) was double impregnated with a solution containing Co, Mo, pyruvic acid (pyruvic acid:Co molar ratio of 3.55). The support was calcined at 375° C. under nitrogen. Its metal content in terms of metal oxides was 44 wt %. Carbon content was 14.2 wt %. The calcined support was sulfided in situ at 500 psi (3448 kPa) and a treat gas rate of 700 Scf/B (125 m$^3$/m$^3$) and tested for HDS activity in a reactor with a catalyst loading of 1.0 cc. In comparison, commercially available KF-757 was evaluated in a parallel reactor under the same condition. After an in-situ sulfiding step, the catalysts were subjected to a virgin distillate feed (Feed #1 in Table 1) at a temperature of 640° F., a total of 500 psig pressure, and a hydrogen gas treat rate of 700 SCF/B. After 336 hr of running on feed, the catalyst HDS activity was 160% of the KF-757 run under the same conditions on a basis of 1.5 order kinetics.

The above impregnation, calcination, and sulfidation steps can also be used to form a rejuvenated catalyst. In such a rejuvenation process, a spent partially spent catalyst can be stripped and regenerated. The regenerated catalyst can then be impregnated according to above method. Note that due to the presence of metals on the regenerated catalyst, preferably only one impregnation step can be used.

EXAMPLE 6

The following procedure can be used for either impregnating alumina supports to make fresh catalyst, or for impregnating regenerated catalyst as part of a rejuvenation process. 8.66 g pyruvic acid was mixed with 6.88 g cobalt acetate tetrahydrate to make a uniform slurry. 9.76 g ammonium heptamolybdate (AHM) tetrahydrate was dissolved in 10.25 g DI water at 40° C. The AHM solution was added slowly to the slurry without heating under stirring. Stirring was continued until all cobalt acetate was dissolved. The resulting solution (Co/Mo/pyruvic acid) had the following concentrations: 1.1 M Co; 2.2 M Mo; pyruvic acid/Co molar ratio=3.55.

After the preparation of the impregnating solution, the solution can be used to form fresh catalyst. To form a fresh catalyst, 1.2 g of SC-159 alumina (sized to 90-300 μm) was impregnated with 1.62 g of the Co/Mo/pyruvic acid solution and heated under flowing $N_2$ according to the following furnace conditions: 20° C. to 55° C. at 1° C./min; hold at 55° C. for 10 min; 55° C. to 120° C. at 0.3° C./min; hold at 120° C. for 4 hr; from 120° C. to 330° C. at 1.2° C./min, hold at 330° C. for 4 hr. The resulting material was impregnated a second time with 1.54 g of the same solution and heated in the same manner as the $1^{st}$ impregnation. The final material was re-sized to 90-300 μm and tested for hydrodesulfurization and hydrodenitrogenation.

An alternative fresh catalyst was also formed. 1.1 g of SA-6175—Saint-Gobain NorPro—(sized to 90-300 μm) was impregnated with 2.21 g of Co/Mo/pyruvic acid solution, as described above, and heated in the same manner as the catalyst described above. The resulting material was impregnated a second time with 1.99 g of the same solution and heated again in the same manner. The final material was re-sized to 90-300 μm and tested for hydrodesulfurization and hydrodenitrogenation.

The calcined materials were sulfided in situ at 500 psi (3448 kPa) and a treat gas rate of 700 Scf/B (125 $m^3/m^3$) and tested for HDS activity in a reactor with a catalyst loading of 1.0 cc. In comparison, commercially available KF-757 was evaluated in a parallel reactor under the same conditions. After the in-situ sulfiding step, the catalysts were subjected to a virgin distillate feed (Feed #1 in Table 1) at a temperature of 625° F., a total of 500 psig pressure, and a hydrogen gas treat rate of 700 SCF/B. After about 160 hr of running on feed, the temperature was adjusted to 640° F. After about 380 hr of running on feed, the first catalyst displayed HDS activity 150% of the KF-757 run under the same conditions on a basis of 1.5 order kinetics while the second catalyst displayed HDS activity 225% of KF-757.

The above impregnation, calcination, and sulfidation steps can also be used to form a rejuvenated catalyst. In such a rejuvenation process, a spent or partially spent catalyst can be stripped and regenerated. The regenerated catalyst can then be impregnated according to above method. Note that due to the presence of metals on the regenerated catalyst, preferably only one impregnation step can be used.

What is claimed is:
1. A process for rejuvenating a supported hydroprocessing catalyst, comprising:
a) providing a supported hydrotreating catalyst that is formed by
   i) impregnating a support with a solution, slurry, or mixture containing at least one Group VIB metal, at least one Group VIII metal, a second organic acid containing a —C(=O)OH functional group and at least one additional functional group selected from carboxylic acid —C(=O)OH, hydroxamic acid —C(=O)N(H)OH, hydroxy —OH, keto >C=O, amino —$NH_2$, amido —C(=O)$NH_2$, imino >C=NH, epoxy —COC, and thio —SH, optionally an additional transition metal, and optionally water or at least one organic additive different from the second organic acid,
   ii) drying the impregnated support at a temperature from 200° C. to 450° C. to produce a partially calcined, impregnated support having a carbon content of at least 5 wt % based on the weight of the partially calcined, impregnated support, the at least one organic additive not being present on the partially calcined, impregnated support, and
   iii) sulfiding the partially calcined, impregnated support that includes at least a portion of the carbon content, which supported hydrotreating catalyst is at least partially spent;
b) stripping the supported hydrotreating catalyst at a temperature less than about 350° C., the supported hydrotreating catalyst including a support, at least one Group VIB metal, and at least one Group VIII metal;
c) regenerating the stripped catalyst in the presence of an oxygen containing gas at a temperature of about 500° C. or less;
d) impregnating the regenerated catalyst with a solution, slurry, or mixture consisting essentially of at least one Group VIB metal, at least one Group VIII metal, a first organic acid containing a —C(=O)OH functional group and at least one additional functional group selected from carboxylic acid —C(=O)OH, hydroxamic acid —C(=O)N(H)OH, hydroxy —OH, keto >C=O, amino —$NH_2$, amido —C(=O)—$NH_2$, imino >C=NH, epoxy —COC, and thio —SH, optionally an additional transition metal, and optionally water or at least one organic additive different from the first organic acid;
e) partially calcining the impregnated, regenerated catalyst at a temperature from about 300 to about 400° C. to produce a partially calcined, impregnated, regenerated catalyst having a carbon content of at least 5 wt % based on the weight of the partially calcined, impregnated, regenerated catalyst, the at least one organic additive not being present on the partially calcined, impregnated support; and
f) sulfiding the partially calcined, impregnated, regenerated catalyst.

2. The process of claim 1, wherein the dried, impregnated, regenerated catalyst is subjected to at least one further cycle of steps (c) and (d) until an impregnated, regenerated support having a total Group VIB and Group VIII metals content of at least about 35 wt % is produced.

3. The process of claim 1, wherein the solution, slurry, or other mixture further comprises at least one organic additive different from the first organic complexing agent.

4. The process of claim 1, wherein the first organic acid is glyoxylic acid, pyruvic acid, or citric acid.

5. The process of claim 1, wherein the second organic acid is glyoxylic acid, pyruvic acid, or citric acid.

6. The process of claim 1, wherein the first complexing agent is different from the second complexing agent.

7. The process of claim 1, wherein stripping the supported hydrotreating catalyst comprises stripping the supported hydrotreating catalyst with a flowing gas stream at a temperature of about 350° C. or less.

8. The process of claim 7, wherein the supported hydrotreating catalyst is stripped with a flowing inert gas.

9. The process of claim 1, wherein the supported hydrotreating catalyst is stripped using a solvent stripping sequence.

10. The process of claim 1, wherein the supported hydrotreating catalyst is a spent or partially spent catalyst having about 20 wt % or less of coke.

11. The process of claim 1, wherein at least one of the Group VIB metal and the Group VIII metal is provided as a metal salt having an anion that is a conjugate base of the first organic complexing agent or the at least one organic additive.

12. The process of claim 1, wherein the solution, slurry, or mixture comprises at least one additional transition metal.

13. The process of claim 12, wherein the at least one additional transition metal comprises Co, Mo, Ni, W, Zn, Fe, Cu, or Mn.

14. The process of claim 1, wherein impregnating a regenerated catalyst with the solution, slurry, or mixture comprises impregnating the regenerated catalyst with a volume of solution per volume of support that is between about 0.9-1.05 times the pore volume of the support per volume of support.

15. The process of claim 1, wherein impregnating a regenerated catalyst with the solution, slurry, or mixture comprises impregnating the regenerated catalyst with a volume of solution per volume of catalyst that is between about 0.9-1.05 times the pore volume of the support per volume of catalyst.

16. A process for making a supported hydroprocessing catalyst from a regenerated catalyst, comprising:
   a) providing a regenerated supported hydrotreating catalyst that was at least partially spent and was regenerated in the presence of an oxygen containing gas at a temperature of about 500° C. or less, the regenerated catalyst corresponding to a fresh catalyst formed by
      i) impregnating a support with a solution, slurry, or mixture containing at least one Group VIB metal, at least one Group VIII metal, a second organic acid containing a —C(=O)OH functional group and at least one additional functional group selected from carboxylic acid —C(=O)OH, hydroxamic acid —C(=O)N(H)OH, hydroxy —OH, keto >C=O, amino —NH$_2$, amido —C(=O)—NH$_2$, imino >C=NH, epoxy —COC, and thio —SH, optionally an additional transition metal, and optionally water or at least one organic additive different from the second organic acid,
      ii) drying the impregnated support at a temperature of from 200 to 450° C. to produce a partially calcined, impregnated support having a carbon content of at least 5 wt % based on the weight of the partially calcined, impregnated support, the at least one organic additive not being present on the partially calcined, impregnated support, and
      iii) sulfiding the partially calcined, impregnated support that includes at least a portion of the carbon content;
   b) impregnating a regenerated catalyst with a solution, slurry, or mixture, the regenerated catalyst including a support, at least one Group VIB metal, and at least one Group VIII metal, and the solution, slurry, or mixture consisting essentially of at least one Group VIB metal, at least one Group VIII metal, a first organic acid containing a —C(=O)OH functional group and at least one additional functional group selected from carboxylic acid —C(=O)OH, hydroxamic acid —C(=O)N(H)OH, hydroxy —OH, keto >C=O, amino —NH$_2$, amido —C(=O)—NH$_2$, imino >C=NH, epoxy —COC, and thio —SH, optionally an additional transition metal, and optionally water or at least one organic additive different from the first organic acid;
   c) partially calcining the impregnated, regenerated catalyst at a temperature from about 300 to about 400° C. to produce a partially calcined, impregnated, regenerated catalyst having a carbon content of at least 5 wt % based on the weight of the partially calcined, impregnated, regenerated catalyst, the at least one organic additive not being present on the partially calcined, impregnated support; and
   d) sulfiding the partially calcined, impregnated, regenerated catalyst that includes at least a portion of the carbon content.

17. The process of claim 16, wherein at least one of the Group VIB metal and the Group VIII metal is provided as a metal salt having an anion that is a conjugate base of the first organic complexing agent or the at least one organic additive.

18. The process of claim 16, wherein the solution, slurry, or mixture comprises at least one additional transition metal.

19. The process of claim 18, wherein the at least one additional transition metal comprises Co, Mo, Ni, W, Zn, Fe, Cu, or Mn.

20. The process of claim 16, wherein impregnating a regenerated catalyst with the solution, slurry, or mixture comprises impregnating the regenerated catalyst with a volume of solution per volume of support that is between about 0.9-1.05 times the pore volume of the support per volume of support.

21. The process of claim 16, wherein impregnating a regenerated catalyst with the solution, slurry, or mixture comprises impregnating the regenerated catalyst with a volume of solution per volume of catalyst that is between about 0.9-1.05 times the pore volume of the support per volume of catalyst.

22. The process of claim 1, wherein the solution, slurry, or mixture in step d) contains only one Group VIB metal selected from Mo or W.

23. The process of claim 16, wherein the solution, slurry, or mixture in step b) contains only one Group VIB metal selected from Mo or W.

\* \* \* \* \*